US008082459B2

(12) United States Patent  
Araujo, Jr.

(10) Patent No.: US 8,082,459 B2  
(45) Date of Patent: Dec. 20, 2011

(54) POWER MANAGEMENT BASED ON POLICY

(75) Inventor: Nelson S. Araujo, Jr., Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 830 days.

(21) Appl. No.: 12/037,104

(22) Filed: Feb. 26, 2008

(65) Prior Publication Data

US 2009/0217065 A1    Aug. 27, 2009

(51) Int. Cl.  
*G06F 1/26* (2006.01)

(52) U.S. Cl. .......................... 713/323; 713/300

(58) Field of Classification Search .................. 713/300, 713/323  
See application file for complete search history.

(56) References Cited

U.S. PATENT DOCUMENTS

| | | | |
|---|---|---|---|
| 5,428,790 A | 6/1995 | Harper et al. | |
| 5,511,205 A | 4/1996 | Kannan et al. | |
| 5,913,068 A * | 6/1999 | Matoba | 713/322 |
| 5,922,075 A * | 7/1999 | Bowker | 713/300 |
| 6,697,953 B1 * | 2/2004 | Collins | 713/320 |
| 6,990,593 B2 | 1/2006 | Nakagawa | |
| 7,079,904 B1 | 7/2006 | Forstrom et al. | |
| 7,228,441 B2 | 6/2007 | Fung | |
| 7,231,198 B2 * | 6/2007 | Loughran | 455/343.2 |
| 7,318,164 B2 * | 1/2008 | Rawson, III | 713/320 |
| 7,328,354 B2 * | 2/2008 | Hsu | 713/300 |
| 7,596,709 B2 * | 9/2009 | Cooper et al. | 713/323 |
| 7,707,437 B2 * | 4/2010 | Berenbaum et al. | 713/300 |
| 2004/0042435 A1 | 3/2004 | Soomro et al. | |
| 2007/0008887 A1 | 1/2007 | Gorbatov et al. | |
| 2007/0124443 A1 | 5/2007 | Nanda et al. | |
| 2007/0281658 A1 | 12/2007 | Chou | |
| 2008/0294920 A1 * | 11/2008 | Hatasaki et al. | 713/323 |

OTHER PUBLICATIONS

Agarwal et al, "Power Management System for Embedded RTOS: An Object Oriented Approach", IEEE, CCECE/CCGEI, Ottawa, May 2006, pp. 2305-2309.

"Dynamic Power Management for Embedded Systems", IBM and MontaVista, Nov. 19, 2002, pp. 1-25.

Microsoft Corporation, "Active State Power Management in Windows Vista", http://www.microsoft.com/whdc/system/bus/pci/aspm.mspx, Apr. 13, 2006.

* cited by examiner

*Primary Examiner* — Nitin Patel

(57) ABSTRACT

A machine's power usage may be managed by a power-management policy. When a program makes a request that involves use of one of the machine's power-consuming devices, the policy may take into account factors such as the program's status, where the status indicates the program's relative level of justification to consume power. A component may intercept a request to use a device before the request reaches the driver, and may deflect requests that, if carried out, are not consistent with power usage policy. Infrastructure supports the use of policies that determine whether a particular device's power state will be changed.

20 Claims, 6 Drawing Sheets

POWER MANAGEMENT BASED ON POLICY

BACKGROUND

Machines such as computers, telephones, audio/visual equipment, etc., employ power management schemes to govern the use of energy. Battery-powered machines have a finite amount of energy stored between charges, and these machines generally attempt to use the energy in a way that strikes a balance between providing functionality and maintaining longevity of the charge. Electricity is expensive, so even machines that are connected to power sources manage their use of energy in order to reduce the cost of operation. A large server farm may draw several megawatts of power, so managing energy consumption may become an increasingly prominent issue, as the cost of producing electricity increases.

A machine may include various devices that draw power, such as a disk, network card, processor, monitor, etc. Power management is normally based on figuring out when each of these devices is to be turned on or off. For example, a power management rule for a computer might state that the monitor is turned off if the keyboard has not been used for ten continuous minutes, since ten minutes of keyboard inactivity suggest that there may be no one present at the machine to look at the monitor. Similar rules may govern disk drives or network cards. If a device has been powered off and then a program makes a request that involves the device, the device is generally powered back on to service the request. This power management technique does not take into account factors, such as whether the program merits the use of the power that would be involved in servicing the program's request. Moreover, when a machine is being powered by a battery, this technique tends to reward early requests for power at the expense of requests that might arise later, even if the later requests would be more meritorious uses of energy than the earlier requests. Power management schemes generally lack the infrastructure to make determinations about power usage based on a rich or complex set of factors.

SUMMARY

Power management for a machine may be based on rich policies. These policies may take into account a variety of factors when determining whether to change the power state of a device. A power management runtime may enforce the policy, and may determine whether a particular change of power state for a device is allowed under a policy.

A machine may comprise various devices. Each of these devices may have various power states. "On" and "off" are examples of power states, but some devices have power states other than on and off. A monitor may have several different brightness levels, and a processor may be able to operate at different clock speeds. These are examples of power states. A policy may govern whether a device is allowed to change from one power state to another. The policy may take into account any factors. One example factor is the identity and status of the program that is requesting action from a device. For example, if a device such as a disk or network card is powered off and a program makes a request to use that device, the policy may specify that certain programs have sufficient status to justify turning on the device and that others do not. Or, a given program may sometimes justify consuming power, depending on what the program is doing. For example, if the monitor is turned off and a program is requesting to turn the monitor on to display a message, the policy may specify that the monitor is to be turned on, or not, depending on what type of message the program is trying to display. A policy may also take other factors into account, such as current power consumption, the amount of energy stored in a battery, predictions about future power usage, or any other factor.

A program normally requests use of a device through the driver that controls the device. A request deflector may be interposed between the program and the device driver. The request deflector may deflect certain requests from the device based on power management concerns. Thus, if a particular request does not justify powering a device under the power management policy, the request deflector may prevent the request from being passed to the device driver.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
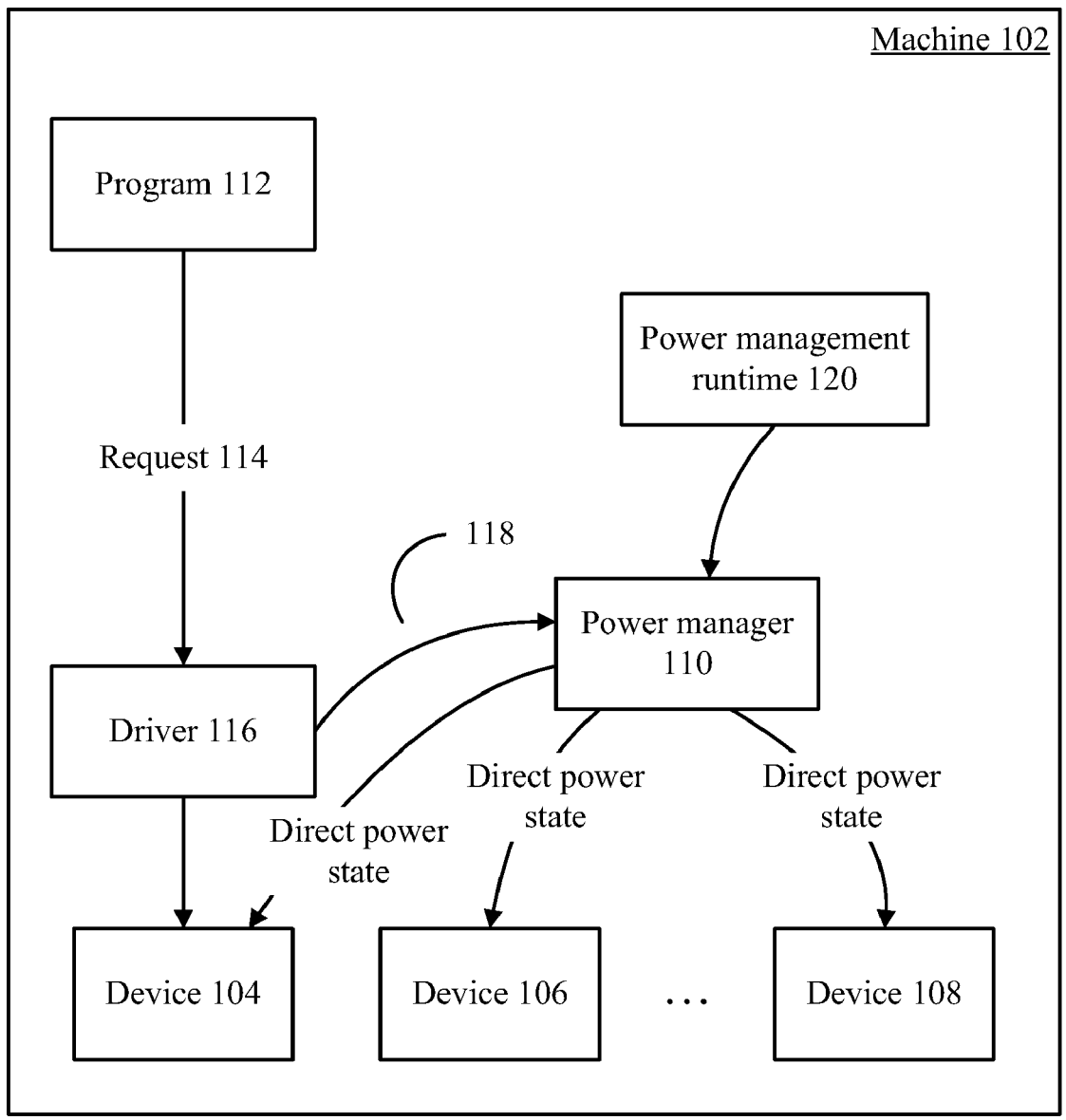
FIG. 1 is a block diagram of a scenario in which power usage may be controlled.

Electronic devices (e.g., computers, wireless telephones, audio/video equipment, etc.) normally employ some type of power management framework. For example, a desktop or notebook computer may determine, after some period of inactivity, to enter sleep mode, turn off the monitor, turn off the hard disk, etc. Similarly, a wireless telephone may turn off its display after some period of inactivity. Certain devices may use variable amounts of power, such as a processor that runs at different speeds (lower clock speeds generally consume less power) or a monitor that displays variable levels of brightness (less brightness generally consumes less energy). Thus, a power management scheme may run a device in a lower-power-consumption mode, such as when a computer turns down the monitor brightness and processor speed when its remaining battery power drops below a certain threshold.

Power management schemes are normally based on simple rules for deciding when to turn power on or off. An example of such a rule is a timeout, where a device (e.g., disk, monitor, etc.) is turned off after some continuous amount of inactivity. Another example of such a rule is that any request to use the device may cause the device to be turned on if the device is off at the time of the request. These rules may not strike the right balance between power conservation and performance. For example, a device (e.g., a hard disk) might use the same amount of power to start up as it does to run for 15 seconds. If the disk has been inactive for some number of minutes and then shuts down, there is an initial saving in power. But if the disk starts up one second after it has been stopped, then net power usage is greater than if the disk had not been stopped. Existing power management schemes encourage this type of behavior, since they tend to start a device whenever any program requests usage.

Some programs merit the use of power to service any request. Other programs do not. For example, after fifteen minutes of inactivity, the power manager may turn the disk off. Ten seconds later, a scheduled software update may run and may request use of the disk. Under normal power management schemes, the software update program's request for the disk will cause the disk to be restarted, regardless of the power cost, and regardless of the relative value of running the update at that moment in time. The software update program performs a valuable function. However, if the system is, say, running on battery power, it may be possible to wait for the update until the system is plugged in so that energy can be saved to allow the user to work longer before running out of battery power. Or, security conditions may be such that there is a reason to perform the software update at that moment regardless of the power expenditure—e.g., if there is known to be a zero-day attack propagating through the Internet, in which case delaying the update might expose the computer to an attack. Existing power management schemes generally do not take these considerations into account when evaluating requests to power a device. Rather, any request for a resource may result in the resource being powered to service the request, regardless of why the resource is being requested, and without weighing those reasons against the relatively complex set of conditions that may exist at a machine. The reason these considerations are not taken into account is generally that power management schemes generally support simple rules (e.g., turn the disk off after fifteen minutes, but turn it back on as soon as any program requests to use the disk), and not rich policies.

Additionally, a request to use a device is normally put through to the device's driver. If the device has been turned off, the driver may advise the program that makes the request that the device is off. However, a layer can be interposed between the requesting program and the driver, which may deflect requests based on power policy considerations, before the requests reach the driver. Thus, a program could be notified that a request to use a device is not being put through to the device because the request would be contrary to power-usage policy.

Turning now to the drawings, FIG. 1 shows an example scenario in which power may be controlled for devices. A machine 102 may have one or more devices, such as devices 104, 106, and 108. Devices 104-108 may be any types of devices, such as disks, network adapters, processors, monitors, etc. Devices 104-108 may be incorporated within machine 102, or may be peripherals that are attached to machine 102.

Power manager 110 is a component that controls the use of power by devices 104-108. Power manager 110 turns devices 104-108 on or off, or otherwise affects their power state. Some devices may be able to assume an intermediate power usage between fully-on and fully-off, in which case power manager 110 may place a device in one of several states (or, in the case of analog variability, could also act as a rheostat). For example, a monitor may operate at different levels of brightness, or a processor may operate at different clock speeds. These brightness levels and clock speeds may be associated with different levels of power consumption. Power manager 110 may set the level of power consumption for a given device 104-108. On and off are examples of power states, as are any kind of discrete or continuous intermediate states.

Program 112 is software that runs on machine 102, or hardware that implements some process on machine 102. Program 112 may be application software, system software, or any other type of software or hardware. Program 112 may make a request 114 to perform an action that involves a device, such as device 104. For example, device 104 could be a hard disk, and request 114 may be a request to read data from the hard disk. As another example, device 104 may be machine 102's wireless network card, and request 114 may be a request to send data over a wireless network. Request 114 is normally issued through driver 116, which is a software driver appropriate for a particular device 104.

Driver 116 may process request 114 by causing (or attempting to cause) device 104 to perform the action sought in the request. As part of processing the request, driver 116 may attempt to determine if device 104 is on or off. If device 104 is on, then driver 116 may (or may not) direct that device 104 perform the requested action. (Request 114 could be denied or delayed for various reasons, such as that device 104 may be busy servicing a different request. Moreover, device 104 might not be directed to carry out the request even if device 104 is on—for example, since a network card may use more power when transmitting than when idle, a network card that might be directed not to carry out a request in order to conserve power, even if the network card is on.) However, if device 104 is off, then driver 116 may communicate with power manager 110 (as indicated by arrow 118) to request that power manager 110 turn on device 104. Or, request 114 may go unfulfilled due to the off state of device 104, and driver 116 may inform program 112 that request 114 has been denied, delayed, etc., because device 104 is off. (As discussed below in connection with FIG. 6, a component situated between program 112 and driver 116 may deny a request based on power usage considerations before the request reaches driver 116.)

Power manager 110 controls the respective power states of devices 104-108. Power manager 110 could be implemented as a kernel/system software component, a user-level software component, hardware, or as any other kind of component. Under a normal power management scheme, power manager 110 may cause devices to be turned off, or into a lower power state, based on factors such as timers, the amount of battery power remaining, or any other factor. For example, a monitor may be turned off after n minutes of keyboard inactivity on the theory that the lack of keyboard activity indicates the user is not present to view the monitor. As another example, a processor may be turned down from, say, 2.0 GHz to 600 MHz when fifty percent of the energy in the battery has been depleted, in order to lengthen the remaining time left on the battery when the supply of stored energy is low. However, these are relatively simple power management considerations. If a device is off, it may make sense to service some requests but not others, depending on circumstances. As noted above, an on-line software update may be valuable, but—depending on circumstances—may or may not be worth expenditure of battery power to run the disk, network card, etc., involved in the update. Power management runtime 120 may implement policies that determine when, and under what circumstances, power manager 110 is to turn devices 104-108 on or off, or is to place those devices in a different power state.

Figure 2:
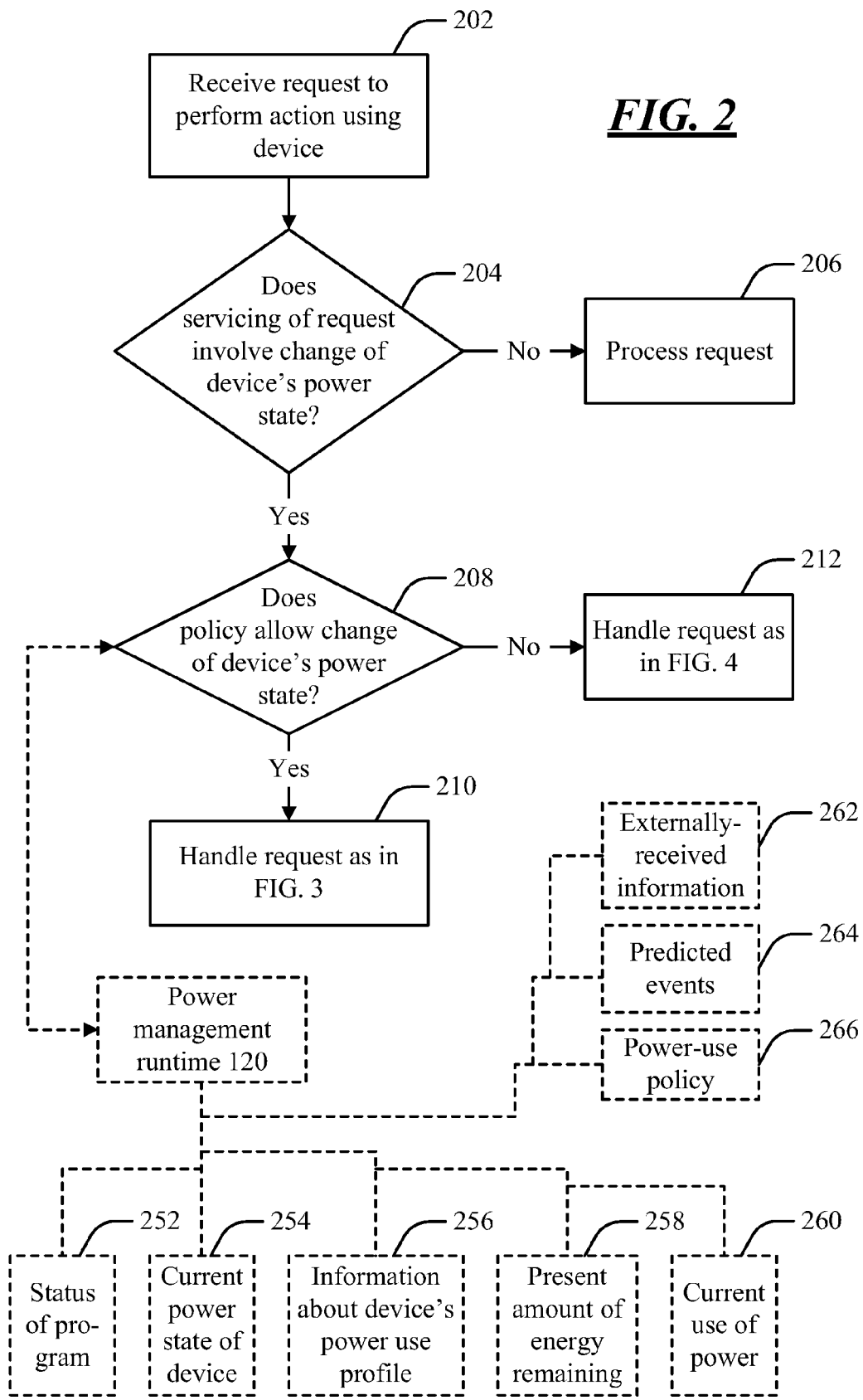
FIG. 2 is a flow diagram of a process in which a request to change the power state of a device may be decided.
Figure 5:
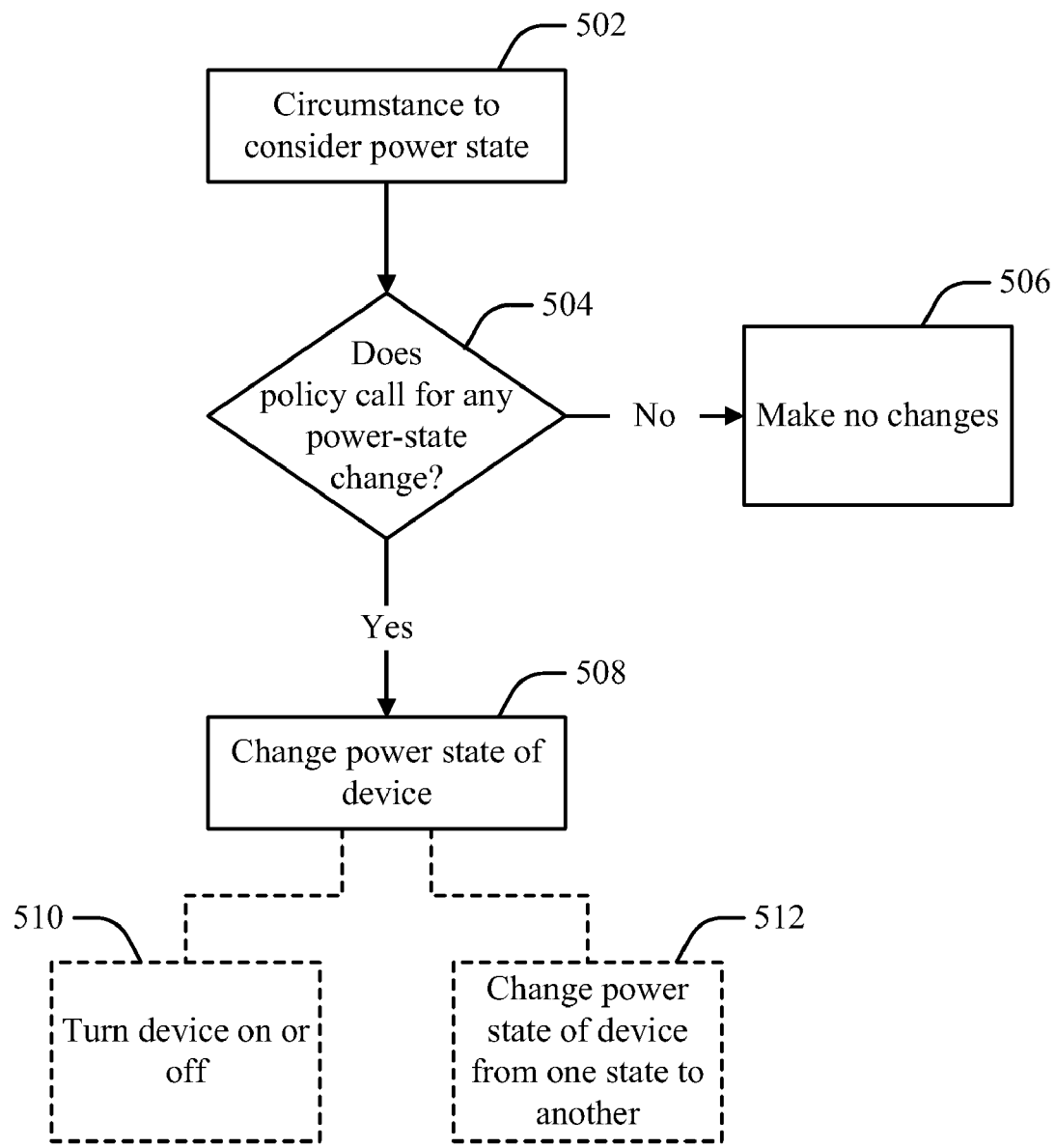
FIG. 5 is a flow diagram of a process in which a power-management policy may be applied.

FIG. 2 shows an example process in which a program's request to use a power-consuming device may be decided. The flow diagram of FIG. 2 (as well as that of FIG. 5, discussed below) are described with reference to components discussed herein. For example, the following description of FIG. 2 makes reference to components shown in FIG. 1. However, the processes shown in the flow diagrams may be carried out in any system and are not limited to the scenarios discussed herein. Additionally, each of the flow diagrams in FIGS. 2 and 5 shows an example in which stages of a process are carried out in a particular order, as indicated by the lines connecting the blocks, but the various stages shown in these diagrams can be performed in any order, or in any combination or sub-combination.

Figure 6:
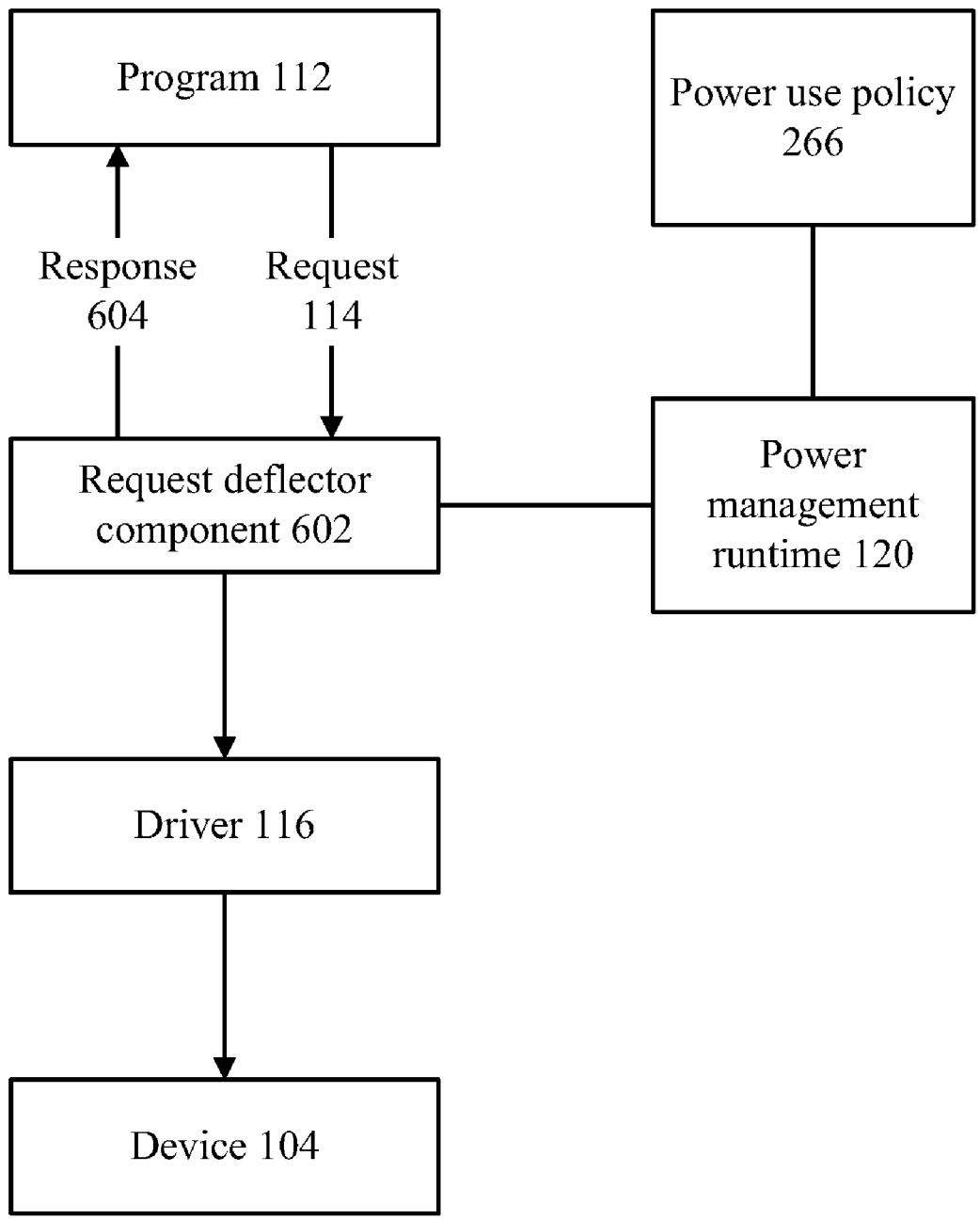
FIG. 6 is a block diagram of a scenario in which a deflector component handles a request to use a device.

At 202, a request to perform an action using a particular device is detected. For example a request to write data to a disk may be received, in which case the device that would be involved in servicing the request is the disk drive. If the disk drive is, e.g., device 104 (shown in FIG. 1), then the request may be received by driver 116 (also shown in FIG. 1). However, the request could be received by any component. One example of such other component is shown in FIG. 6 and discussed below, in which a deflector component receives or intercepts requests and responds to the requests based on power management considerations before the request reach a device driver.

At 204, it is determined whether servicing of the request involves a change in the device's power state, such as a change from off to on, a change from one intermediate power state to another, or a change between an extreme power state (on or off) and an intermediate power state. If servicing the request does not involve such a change, then the request may processed (at 206)—e.g., if the request is to write data to a disk and the disk drive is already on, then the write request may be proceed as normal. If servicing the request does involve a change in the device's power state, then it may be determined (at 208) whether a policy (e.g., a power management policy) allows the device's power state to be changed to service the request. This determination may be made, for example, by power management runtime 120, and may involve various considerations. Typically, a device's power state is changed based on the mere fact that a request to use the device is being made (e.g., a request to use a disk that is off typically results in the disk being turned on). However, in an example implementation of the subject matter herein, a justification to change a device from one power state to another may be based on at least one factor other than the mere fact that a request to use the device has been made.

The following are some example considerations that power management runtime 120 may use to determine whether the device's power state may be changed:

Status of program (block 252). For the purpose of power management, a program may have a status that reflects its worthiness to consume power. For example, some programs may have a "VIP" status that allows them to consume power in situations where other programs would not be permitted to consume power. ("VIP" typically stands for "very important person", but in this context may be applied to a program in this sense of denoting one program's relative merit or justification to consume energy.) Programs could be assigned binary VIP/non-VIP status, or their status could be indicated on a scale (e.g., a scale of 1-10, indicating a given program's relative worthiness to receive a power allocation). Whether a program is permitted to consume power could be based on a finding as to whether the program's status justifies the consumption of power under the circumstances that are present.

Current power state of the device (block 254). The current power state of a device may be a factor in determining whether the power state will be changed. For example, a device may use a considerable amount of power to turn from off to on. (E.g., a hard disk may use more power to start up than it uses to run for several seconds.) However, changing a device from a low power state to a high power state may use less power than turning the device from off to on. (E.g., changing the brightness on a monitor from one level to another may consume less power than powering the monitor on from its off state.) Thus, the current power state of the device may be a factor in deciding whether to change power state, and the way in which the current power state is considered may be written into a policy. As one example, a policy may incorporate a concept of inertia—e.g., some form of resistance to changing a device's power state away from its current power state.

The power use profile of the device (block 256). This factor represents how much power a device uses, under a given set of circumstances, such as during operation of the device, during start-up of the device, etc. For example, a disk may draw a particular number of watts while it is running, may draw a different number of watts while it is staring up (or changing from one intermediate power state to another), and the amount of power drawn could vary based on a function of the disk's temperature. The foregoing is one example a device's power usage profile. If a power usage profile indicates different amounts of power usage based on certain state transitions (e.g., if a transition from off-to-on draws a different amount of power than a transition from one intermediate sate to another), then the power use profile may be considered in conjunction with the device's current state at the time the state change is being considered (see block 254, as discussed above).

The current amount of energy remaining (block 258). The amount of energy remaining in a battery may be considered in determining whether to change a device's power state. For example, the decision as to whether to power a device may be different depending on whether a battery has already discharged 25% (or 75%, or n %) of its energy.

Present use of power (block 260). The amount of power that is presently being drawn may be a consideration in deciding whether to change the power state for a device. For example, a policy may set a target of maintaining power consumption below n watts, or within a range of m to n watts. Thus, the present amount of power consumption may be considered to determine whether a proposed power state change would cause power consumption to fall outside of the target.

Externally-received information (block 262). In determining whether to allow a device to change its power state, information may be considered from outside the machine on which the power is to be consumed. This information may take any form, and may have any type of content. For example, a software update service may not normally merit the use of power when a computer is running on battery power. (E.g., the software update program's status, as represented in block 252, may not normally be high enough to justify using battery power to run devices used by the update program.) However, information may be received from external sources indicating that a zero-day attack is spreading. Such information could be received, in the form of a Really Simple Syndication (RSS) feed that contains security alerts, or could be received in any other form. Such information may be considered in order to determine whether the update program justifies consumption of battery power, even if consumption of battery power to service the program would normally be denied. As another example, an instant messaging program might not normally have sufficient status (see block 252) to justify powering on the monitor, but if the content of the instant message is reporting, say, a change of more than 3% in the price of a particular stock, then this fact may be used to determine that the monitor is to be turned on so that the user is able to see the alert. These are specific examples of how information received from external sources could be used to affect power usage decisions, although any other type of information from external sources could be used.

Predicted events (block 264). Some power consumption events may not have happened yet, but may be anticipated as part of a known pattern of usage. For example, if a particular daemon with high (e.g., "VIP") status is known to use the network card every 30 seconds, this fact may be taken into account in determining whether to change a given device's power state. For example, if an application with a low status is requesting use a network card that is presently turned off, the system might decide that it has enough power to turn on the network card now, but that it would be a more efficient use of power, at relative low cost to perceived service quality, to wait until a high-status daemon makes a request to use the network card. If such a request is expected (e.g., based on past patterns of usage) within, say, the next two seconds, then the low-status application's request may be denied or delayed in view of the anticipated high-status daemon's request. Conversely, if a disk is about to be turned off due to, say, having experienced n continuous minutes of inactivity, but a disk request is anticipated to occur within the next two seconds, then the fact that use of the disk is anticipated may override the timeout, so that, in this example, the disk would not be turned off. Thus, a future event that would call for the use of the device could be predicted, and this prediction could be considered in determining whether to make a present change to the device's power state.

Power use policy (block 266). The power use policy specifies how the various items of information (such as those items represented at blocks 252-264) interact with each other, and how they are used to determine whether a particular device's power state will be changed. The policy may consider any combination or sub-combination of the information, and may weigh this information in any manner. Moreover, the particular information represented at block 252-264 are examples of information that may be considered in power management decisions, but any type of information may be used.

Figure 3:
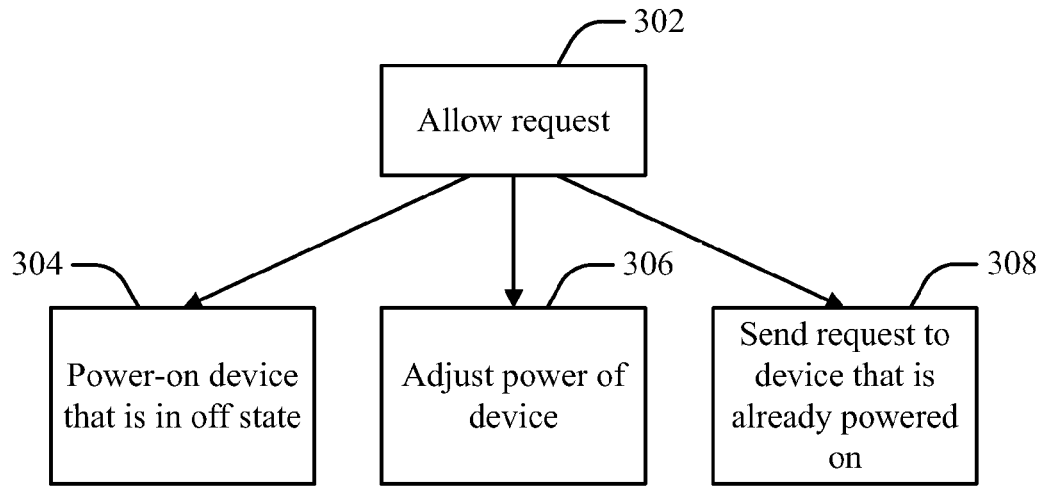
FIG. 3 is a block diagram of various actions that may be taken if a power state change is allowable.

Thus, a component such as power management runtime 120 may use information such as that shown at blocks 252-264, and may also use the policy shown at block 266, to determine whether a device's power state is to be changed. This decision is made at 208. If the policy allows the device's power state to be changed, then the request is allowed, and may be processed as shown in FIG. 3 (block 210). If the policy does not allow the device's power state to be changed (or does not allow the power state to be changed at time the request is considered, but may allow the power state to be changed later), then the request may be processed in the manner shown in FIG. 4 (at 212).

As noted above, various actions may be carried out depending on whether a change in power state is deemed allowable (at 206 or 210 in FIG. 2), or not (at 212 in FIG. 2). FIG. 3 shows various actions that may be taken if a power state change is allowable, and FIG. 4 shows various actions that may be taken if a power state change is not allowable.

FIG. 3 represents example actions that may take place if a power state change is allowable (block 302). If a program requests to use a device that is not powered on, and applying power to the device is allowable under the power management policy, then the device may be powered on in order to allow the device to service the request (block 304). Similarly, if the device may be in one of several power states and servicing a program's request involves placing the device in a different power state (e.g., changing the brightness of a monitor, changing the clock speed of a processor, etc.), then the device may be placed in a different power state to service the request (block 306). Of course, when a program requests to use a device, that device may already be powered on and/or in an appropriate power state. In that case, the program's use of the device does not affect power management, so the already-powered device may be permitted to service the program's request (at 308).

Figure 4:
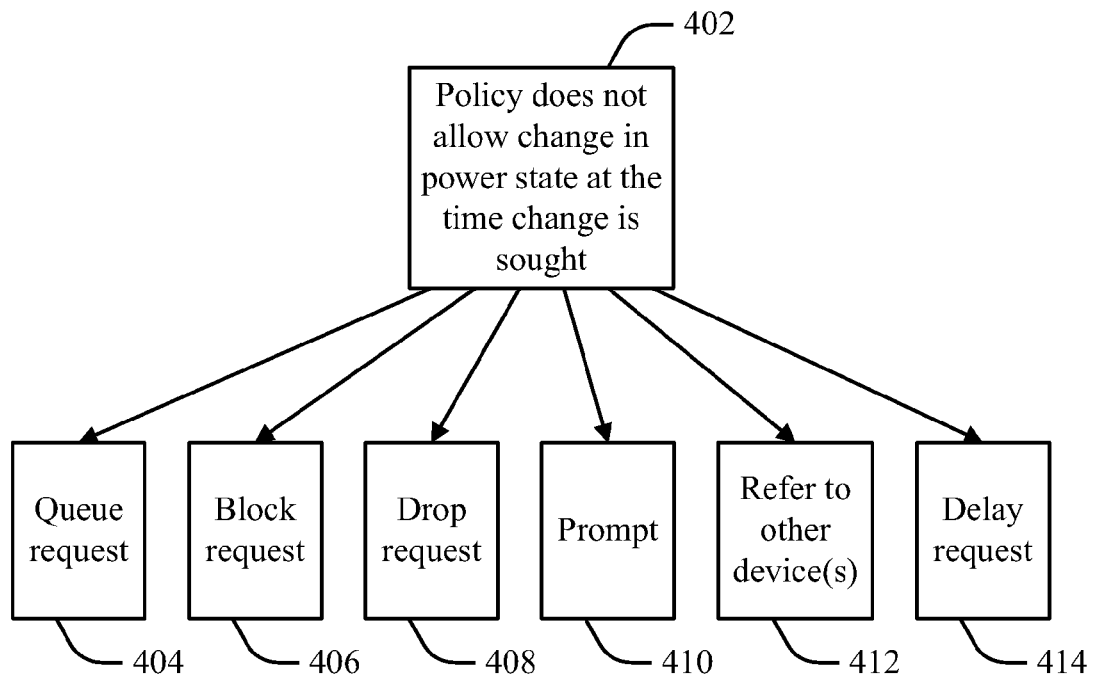
FIG. 4 is a block diagram of various actions that may be taken if a power state change is not allowable.

FIG. 4 represents example actions that may take place if a power state change is not allowable under the policy at the time that the change is sought (block 402). For example, the power state change may be sought in order to turn on a device, or to raise the power state of a device, in order to allow the device to service a request from an application. (However, a power state change could arise for any reason; a program's request to use a device is only one example of such a reason.) Blocks 404-414 represent various example actions that may be performed if the power state change is not allowable under the policy.

One such action is to queue a program's request to be processed at some later time (block 404). For example, if a program requests to use a device that is turned off (e.g., a disk, a network card, etc.), and the power management policy does not allow the device to be turned on at the time of the request, the request may be queued so that it can be serviced at some later. For example, if at some later time the power management policy allows the device to be turned on, then the program's request may be dequeued and processed (although a request could stay in a queue indefinitely while waiting to be processed, or could be denied asynchronously at a later time).

Another such action is to block the request (block 406). In this case, the program making a request to use the device may be notified that the request will not be processed. The program may also be notified that the reason for the request is that the device is off. For example, the program may receive an error code or result code indicating that the request calls for a device that is not turned on. Dropping the request (block 408) is similar to blocking the request, except that when the request is dropped, the request may simply not be carried out without the requesting program's being notified of that fact.

Prompting a user (or other person) for input (block 410) is another action that may be performed when a power state change is not allowable. For example, if a program requests to send data over a network card that has been turned off, a dialog box may be generated on a display that informs the person in front of the display that the card is off. The dialog box may also inform the person of the request's energy-consumption effect, and of whether the requested consumption of energy is permitted under the policy. For example, the dialog box could say, "To preserve battery power, power-use policy blocks this action while the system is unplugged." The dialog box may also solicit input from the person (e.g., "Would you like to proceed anyway?"), or may simply inform the person that the card is off and suggest that the user try again later.

Referring the request to one or more other devices (block 412) is another option. There may be a table, or some other data structure, that lists various devices that could service a request if a particular device is not powered on. Such a table could be consulted. For example, some machines may have more than one instance of the same or similar devices (e.g., plural processors, plural monitors, plural network cards, etc.). If a request to use one of these devices fails because the device is turned off, the request could be sent to other devices in an attempt to use one of the other devices to carry out the request.

Another option is to impose a delay on carrying out the request (block 414). A delayed request may be attempted later at a particular time. For example, a computer could be operating in a "batch" mode that conserves power by allowing network transmissions to happen in bursts rather than at the time the time that the outbound network traffic is generated. The power management policy for such a mode might call for the network card to be turned on at specific intervals (e.g., every fifteen minutes). If a request to transmit data over a network is made between these intervals, the request may be delayed until the next time that the network card is scheduled to be powered on, at which time the request could be allowed.

The foregoing are examples of actions that could be taken if a change in power state is not allowed under a power management policy. However, any action could be taken.

When a power management policy is in place, a component (such as power management runtime 120, shown in FIGS. 1 and 2) may apply the policy by determining whether to make changes to the power state of a device. FIG. 5 shows a process that may be carried out by such a component to apply a policy.

At 502, a circumstance arises to consider a change to a device's power state. This circumstance may take any form. As discussed above, a program may request to use a device that is presently turned off, or is in a power state that is too low to service the request. Such a request is an example of a circumstance in which a power-state change for a device may be considered. Expiration of a timer may also be a circumstance to consider a power-state change (e.g., fifteen minutes of keyboard inactivity may be a reason to turn a monitor off). There are various circumstances that give rise to a consideration of whether to change the power state of a device, and the foregoing are merely examples of such circumstances.

When the circumstance arises to consider a power-state change, it may be determined under the power management policy (at 504) whether to change the power state of a device. If the policy does not call for a power state change, then no changes are made to the device's power state (at 506). Otherwise, the power state is changed in the manner called for by the policy (at 508). The change in power state may take various forms. One example of a power state change is to turn the device from off to on (at 510). Another example of a power state change is to change the device from one intermediate power state to another (at 512), such as changing the processor speed, monitor brightness, etc.

As described above in connection with FIG. 1, a program normally makes a request to use a device through the device's driver. If the device is powered off, the program may learn that the device is off from the driver. However, a component may be interposed between the program and the device driver to deflect requests based on power management policy. The driver is able to inform a program that use of a device is denied because the device is off. However, the existence of a rich power management policy means that a program might be denied use of a device for power-related reasons that are separate from the question of whether the device is powered on or off at the time of the request. The existence of a component between the program and the driver helps to decouple the question of whether a device is on or off from the question of whether a program is allowed to use the device under the ambient power management policy. FIG. 6 shows the use of a component that is interposed between a program and driver, and that may help to enforce a power management policy.

As in FIG. 1, program 112 is a program that may issue a request 114 to be carried out by device 104. Driver 116 is a driver that controls device 104. Power management runtime 120 is a component that implements a power use policy, such as policy 266.

Request deflector component 602 is a component that is interposed between program 112 and driver 116. Request deflector component receives requests before the requests are conveyed to drivers. When request deflector component 602 detects that a request (such as request 114) has been made, it interacts with power management runtime 120 to determine what the ambient policy (e.g., power use policy 266) says about whether the request may be carried out at the expense of power use. If power management runtime 120 determines that request 114 may be carried out under the power policy, then request deflector component 602 passes the request along to driver 116. Otherwise, request deflector component may permanently or temporarily deflect the request from reaching driver 116. In this case, request deflector component 602 may issue a response 604, informing program 112 that request 114 will not be passed to driver 116 (or will not be passed to driver 116 at the present time) based on energy-usage considerations—i.e., based on a determination that satisfying the request would be inconsistent with the power policy. Traditionally, program 112's interaction with a power policy would be through driver 116, when the program either learns that the device is off, or issue a request that results in the device being turned on. Request deflector component 602 provides a different level at which program 112 may interact with a power policy. When request 114 is deflected, the change of a device's power state may be physically prevented or deferred.

FIG. 6 shows request deflector component 602 as a component separate from driver 116. However, request deflector component 602 could be implemented within driver 116, so that requests could driver 116 but be deflected from within driver 116 before being processed by the portion of driver 116 that directly controls actions of device 104. Deflectors could be implemented at plural places inside and/or outside of driver 116, so that request 114 could be deflected at various points along the path from program 112 to device 104.

Figure 7:
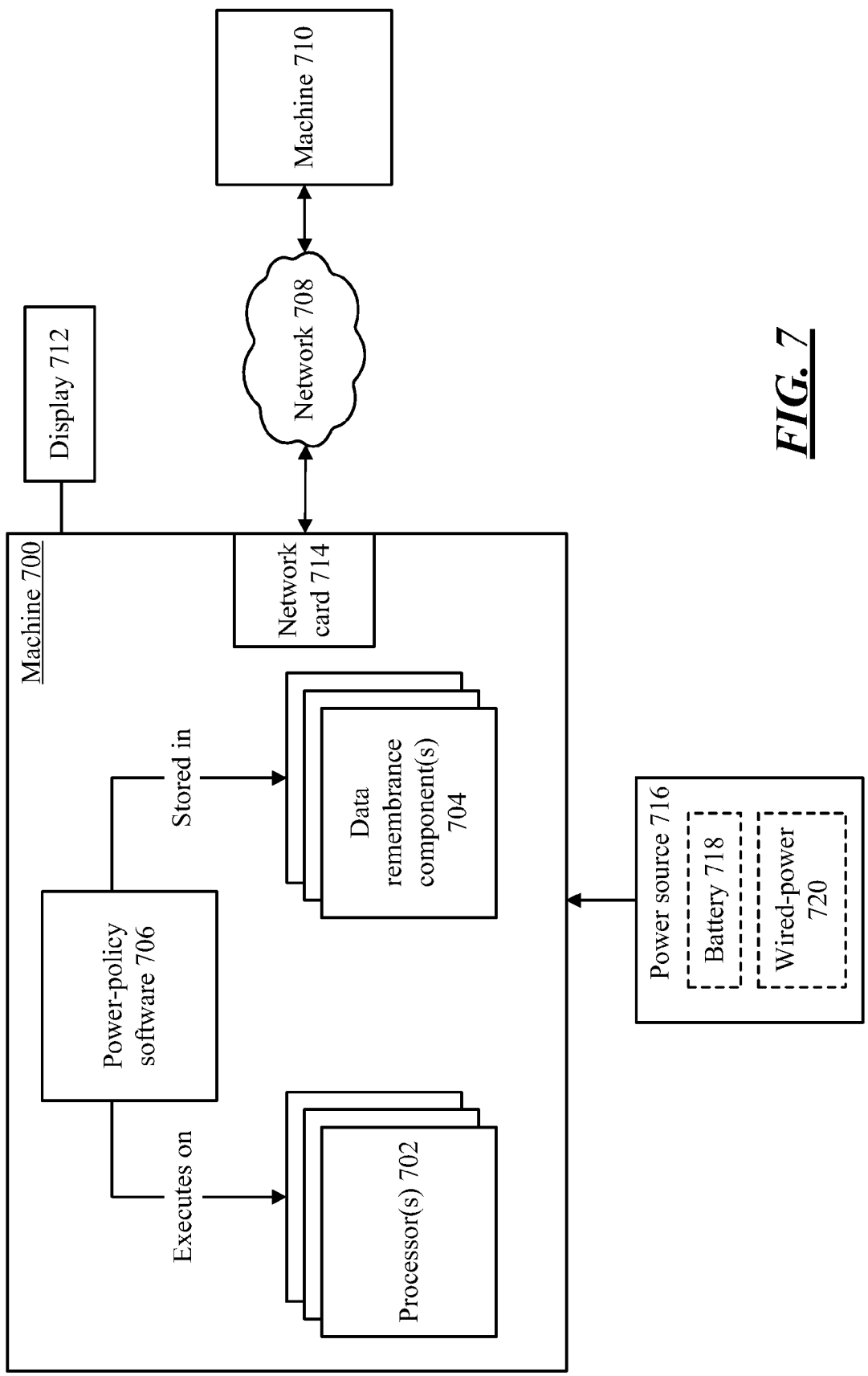
FIG. 7 is a block diagram of example components that may be used in connection with implementations of the subject matter described herein.

FIG. 7 shows an example environment in which aspects of the subject matter described herein may be deployed.

Machine 700 (which is an example of an apparatus) includes one or more processors 702 and one or more data remembrance components 704. Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Machine 700 may comprise, or be associated with, display 712, which may be a cathode ray tube (CRT) monitor, a liquid crystal display (LCD) monitor, or any other type of monitor.

Software may be stored in the data remembrance component(s) 704, and may execute on the one or more processor(s) 702. An example of such software is power-policy software 706, which may implement some or all of the functionality described above in connection with FIGS. 1-6, although any type of software could be used. Software 706 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance component(s) 704 and that executes on one or more of the processor(s) 702. As another example, the subject matter can be implemented as software having instructions to perform one or more acts, where the instructions are stored on one or more computer-readable storage media. Software that implements the subject matter described herein could be configured to operate on one computer, or various functions or components could be distributed across plural computers. In addition to the software implementation mentioned above, the subject matter described herein could be implemented as hardware, or as any combination of software and hardware.

In one example environment, machine 700 may be communicatively connected to one or more other devices through network 708. Machine 710, which may be similar in structure to machine 700 (or may be different from machine 700), is an example of a device that can be connected to machine 700, although other types of devices may also be so connected. Network card 714 is an example component that may be used to facilitate machine 700's communication through network 708. Network card 714 is also an example of a device that may draw power while it is being used, and thus may have its power state managed in accordance with the subject matter herein.

Machine 700 may be powered by power source 716. Battery 718 is one example of power source 716. Wired-power 720 (e.g., power from a wall outlet) is another example of power source 716.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media comprising executable instructions to perform a method, the method comprising:
   receiving a request to perform an action that uses a device in a first power state;
   first determining that, at a time of said request, said device is in a second power state different from said first power state;
   second determining that there is a justification to use energy that would be consumed as a result of changing said device from said second power state to said first power state, said justification being based on at least one factor other than said request's having been made; and
   changing said device, or causing said device to be changed, from said second power state to said first power state.

2. The one or more computer-readable storage media of claim 1, wherein said request is made by a program, and wherein said second determining comprises:
   determining that said program has a status that merits use of power under circumstances present when said program makes said request, said status being one of a set or range of statuses at least one of which does not merit use of power under said circumstances.

3. The one or more computer-readable storage media of claim 1, wherein said second determining is based at least in part on a power use profile of said device, said power use profile comprising information about said device's energy use both during operation of said device and during start-up of said device.

4. The one or more computer-readable storage media of claim 1, wherein the method is being performed on a machine that is running on a battery, and wherein said second determining is based on an amount of energy remaining in said battery.

5. The one or more computer-readable storage media of claim 1, wherein said second determining is based on a prediction of a future event on a machine on which the method is being performed, said prediction comprising an anticipated use of power by said machine or an anticipated use of said device.

6. The one or more computer-readable storage media of claim 1, wherein said second determining is based on data received from a source external to a machine on which the method is being performed.

7. A method of responding to a request to perform an action that uses a device, the method comprising:
   detecting that said request has been issued by a program;
   determining that carrying out said request, under circumstances that are present at a machine on which said program is running, would use energy in a manner that is contrary to a policy;
   based on said determining, permanently or temporarily deflecting said request from reaching a driver that controls said device; and
   physically preventing or deferring a change of said device's power state.

8. The method of claim 7, wherein said preventing or deferring of said change of said device's power state comprises:
   placing said request in a queue, where said request is later dequeued to be processed, waits indefinitely on said queue, or is later denied asynchronously.

9. The method of claim 7, further comprising:
   notifying said program that said request will not be carried out based on an energy-usage consideration.

10. The method of claim 7, wherein said preventing or deferring said change of said device's power state comprises:
    dropping said request without notifying said program that said request is being dropped.

11. The method of claim 7, further comprising:
    generating a prompt that:
    informs a person of said request's energy-consumption effect and of a fact that said effect is not permitted under said policy; and
    solicits said person's input as to how said machine is to proceed with said request.

12. The method of claim 7, further comprising:
    consulting a table that indicates one or more devices other than said device to which said request is referable; and
    referring said request to at least one of said one or more devices.

13. The method of claim 7, further comprising:
    imposing a delay and then allowing said device's power state to be changed to process said request.

14. The method of claim 7, wherein programs that execute on said machine, including said program, are each assigned a status indicating said programs' respective justifications to use energy, and wherein said determining, is based at least in part, on a finding that said program's status is not high enough to justify using energy under said circumstances.

15. An apparatus comprising:
    a power source;
    a device connected to said power source;
    a first component that places said device in one of a plurality of power-consumption states; and
    a second component that directs said first component as to which of said power-consumption states to place said device in based on factors comprising: (a) a circumstance present at said apparatus, and (b) a power-usage policy that takes into account a status of a program that issues a request to use said device, where programs that execute on said apparatus, including said program, are assigned status indicating their respective levels of justification to consume energy.

16. The apparatus of claim 15, wherein said factors further comprise: information received from a source external to said apparatus, said information affecting said program's level of justification to consume energy.

17. The apparatus of claim 15, wherein said factors further comprise: a prediction of a future event that would call for use of said device.

18. The apparatus of claim 15, wherein said factors further comprise: a present power-consumption state of said device, and a resistance to changing said device's power-consumption state away from said present power-consumption state.

19. The apparatus of claim 15, further comprising:
 a driver that controls said device; and
 a third component that deflects said request when carrying out said request would involve changing of said device's power-consumption state from a first state to a second state and said factors indicate that said device is not to be placed in said second state.

20. The apparatus of claim 15, wherein said factors further comprise: an amount of energy that said device uses to transition from a first power state to a second power state, and an amount of power that said device draws while in said first power state or said second power state.

* * * * *